US008050422B2

(12) United States Patent
Zhao et al.
(10) Patent No.: US 8,050,422 B2
(45) Date of Patent: Nov. 1, 2011

(54) AUDIO TEST APPARATUS CAPABLE OF DECREASING NOISE INFLUENCE IN PROCESS OF AUDIO DEVICE TESTING AND METHOD THEREOF

(75) Inventors: Yao Zhao, Shenzhen (CN); Hai-Sheng Li, Shenzhen (CN); Hua-Dong Cheng, Shenzhen (CN); Wen-Chuan Lian, Taipei Hsien (TW); Han-Che Wang, Taipei Hsien (TW); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 790 days.

(21) Appl. No.: 12/166,332

(22) Filed: Jul. 2, 2008

(65) Prior Publication Data

US 2009/0028357 A1 Jan. 29, 2009

(30) Foreign Application Priority Data

Jul. 25, 2007 (CN) .......................... 2007 1 0075319

(51) Int. Cl.
*H04B 15/00* (2006.01)

(52) U.S. Cl. ........................ 381/94.3; 381/103; 704/226

(58) Field of Classification Search ................. 381/94.1, 381/94.3, 98; 704/210, 215, 226–228, 233
See application file for complete search history.

(56) References Cited

U.S. PATENT DOCUMENTS

| | | | | |
|---|---|---|---|---|
| 5,799,270 | A * | 8/1998 | Hasegawa | 704/205 |
| 7,043,030 | B1 * | 5/2006 | Furuta | 381/94.1 |
| 2005/0228660 | A1 * | 10/2005 | Schweng | 704/226 |

* cited by examiner

*Primary Examiner* — Marcos D Pizarro Crespo
*Assistant Examiner* — Sue Tang
(74) *Attorney, Agent, or Firm* — Altis Law Group, Inc.

(57) ABSTRACT

A audio test method for decreasing noise influence, which includes the following steps: obtaining analog signals; converting the analog signals into digital signals; intercepting digital signals of a first predetermined length and executing a first Fast Fourier Transform (FFT), then obtaining an first Fourier spectrum; recording the amplitudes of frequency values of the first Fourier spectrum; intercepting digital signals of a second predetermined length and executing the second FFT, then obtaining an second Fourier spectrum; recording the amplitudes of the frequency values belonging to odd points of the second frequency spectrum, which are the amplitudes of the noise composition; subtracting the amplitudes of the noise composition from the amplitudes of frequency values of the first Fourier spectrum and obtaining a frequency domain signals without noise composition; executing inverse Fast Fourier Transform (iFFT) for the frequency domain signals and obtaining time domain signals, testing each parameter of the time domain signals.

10 Claims, 4 Drawing Sheets

AUDIO TEST APPARATUS CAPABLE OF DECREASING NOISE INFLUENCE IN PROCESS OF AUDIO DEVICE TESTING AND METHOD THEREOF

BACKGROUND

1. Technical Field

The present invention relates to audio test apparatuses, and particularly relates to an audio test apparatus capable of decreasing noise influence in the process of audio device testing and a method thereof.

2. General Background

Nowadays, computers and handheld devices (e.g., mobile phone) are becoming more and more popular. People typically use computers to watch movies or listen to music, while mobile phones are mainly used as a means of communication. As a result, the sound quality output by computers and handheld devices is an important factor in determining user satisfaction. The quality of an audio device, such as a sound box or a speaker, directly correlates to the overall sound quality. Therefore, it is necessary to perform a thorough quality testing on a sound box and a mobile phone's speaker prior to selling them.

Currently, there are two methods of testing the quality of an audio device. The first method of testing simply involves an operator testing whether the sound output by the audio device is acceptable. Although this method is simple, the possibility of damaging the operator's hearing still exists. Another method is to utilize a precision audio testing device, such as "AP2700", which was produced by the Audio Precision Company. A big drawback of using such a testing device, however, is its high cost.

Therefore, there is a need to provide a test apparatus and a method which can achieve better test results without having the above-mentioned shortcomings.

SUMMARY

An audio test apparatus capable of decreasing noise influence in process of audio testing, the apparatus includes: a storage unit, an audio collection device, an audio processing device, a storing module, a Fast Fourier Transform (FFT) module, a calculating module, and a testing module.

The audio collection device is used for collecting analog audio signals. The audio processing device is used for converting analog audio signals into digital audio signals or converting the digital audio signals into the analog audio signals; the storing module is used for storing the digital audio signals in the storage unit.

The Fast Fourier Transform (FFT) module is used for invoking the digital audio signals stored in the storage unit, intercepting digital audio signals of a first predetermined length, and converting the digital audio signals of the first predetermined length into frequency domain signals through a first FFT to obtain a first Fourier spectrum; and also used for intercepting digital audio signals of a second predetermined length and converting the digital audio signals of the second predetermined length into frequency domain signals through a second FFT to obtain a second Fourier spectrum. The storing module is further used for storing amplitudes corresponding to frequency values of the first Fourier spectrum, and amplitudes corresponding to frequency values belonging to odd points of the second Fourier spectrum.

The calculating module is used for subtracting the amplitudes corresponding to the frequency values belonging to odd points of the second Fourier spectrum from the corresponding amplitudes of the frequency values of the first Fourier spectrum, to obtain frequency domain signals without noise composition. The FFT module being further used for converting the frequency domain signals into time domain signals though an inverse Fast Fourier Transform (iFFT). The testing module is used for testing parameters of the time domain signals.

A method for decreasing noise influence in process of audio testing is also provided.

Other advantages and novel features will become more apparent from the following detailed description of embodiments when taken in conjunction with the accompanying drawings.

BRIEF DESCRIPTION OF THE DRAWINGS

The components in the drawings are not necessarily drawn to scale, the emphasis instead being placed upon clearly illustrating the principles of the present test apparatus. Moreover, in the drawings, like reference numerals designate corresponding parts throughout the several views.

DETAILED DESCRIPTION OF THE EMBODIMENTS

Figure 1:
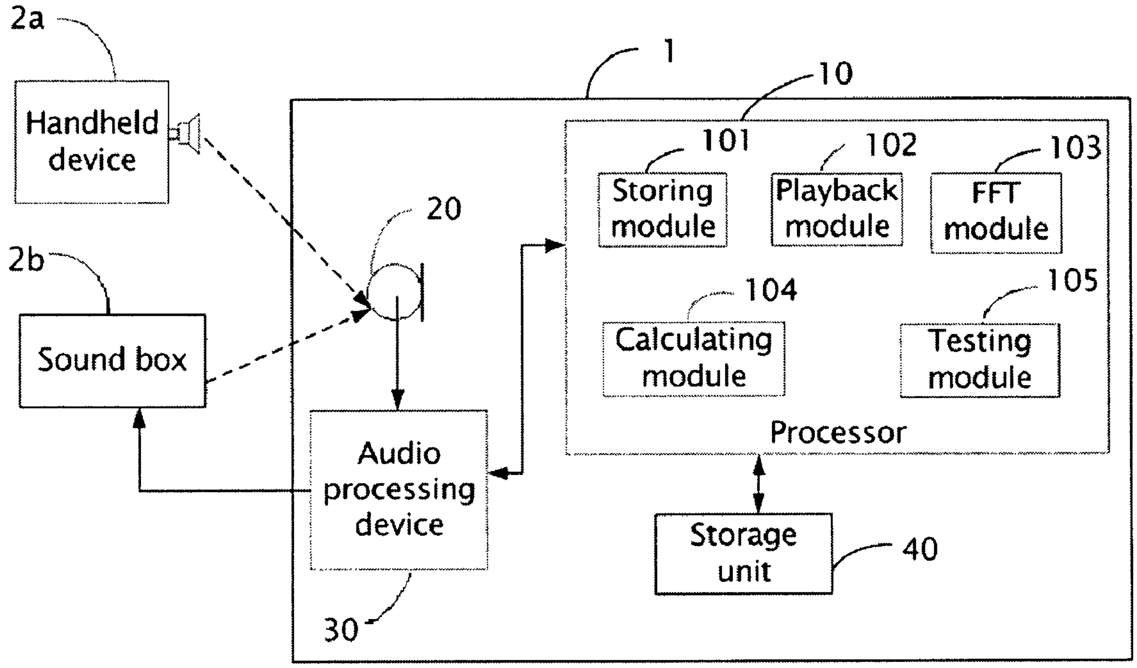
FIG. 1 is a schematic block diagram of an audio device test system capable of decreasing noise influence in accordance with an exemplary embodiment of the present invention.

FIG. 1 is a schematic block diagram of an audio test system capable of decreasing noise influence in accordance with an exemplary embodiment of the present invention. The audio test system includes an audio test apparatus 1 and an audio device. The audio device can be a first audio device 2*a* or a second audio device 2*b*. The first audio device 2*a* can be a handheld device, such as a mobile phone or a media player, among other devices, which is capable of playing media files stored therein. The second audio device 2*b* can be an audio output device, such as a sound box configured for sound output.

The audio test apparatus 1 includes a processor 10, an audio collection device 20, an audio processing device 30, and a storage unit 40. The audio collection device 20 is used to collect analog audio signals output by the first audio device 2*a* or the second audio device 2*b*. In this exemplary embodiment, the audio collection device 20 is a heart-shaped microphone. The audio processing device 30, such as a sound card, is used to convert the analog audio signals into digital audio signals or vice versa. A frequency of the analog audio signals is predetermined, such as 1000 HZ, and a particular media file is provided for generating the analog audio signals.

When the audio device is the first audio device 2*a*, the particular media file is stored in the first audio device 2*a*, the first audio device 2*a* plays the particular media file and outputs the analog audio signals with the predetermined frequency. When the audio device is the second audio device 2*b*, the particular media file can be stored in the storage unit 40 of the audio test apparatus 1 or the first audio device 2*a*. Further, the second audio device 2*b* can be directly connected to the audio test apparatus 1 or connected to the first audio device 2*a* to obtain the analog audio signals and output sound.

The processor 10 includes a storing module 101, a playback module 102, a Fast Fourier Transform (FFT) module 103, a calculating module 104, and a testing module 105. The storing module 101 is used to store the digital audio signals converted by the audio processing unit 30 to the storage unit 40. When the audio device (i.e., the second audio device 2*b*) is connected to the audio test apparatus 1 for testing, the playback module 102 plays the particular media file stored in the storage unit 40 and produces digital audio signals for the media file. The audio processing unit 30 converts the digital audio signals into analog audio signals, and transmits the analog audio signals to the second audio device 2*b* for output as sound. The FFT module 103 is used to convert the digital audio signals stored in the storage unit 40 into frequency domain signals through a first FFT and a second FFT. The detailed description of the first FFT and the second FFT is described later with references to FIG. 2 and FIG. 3.

Figure 2:
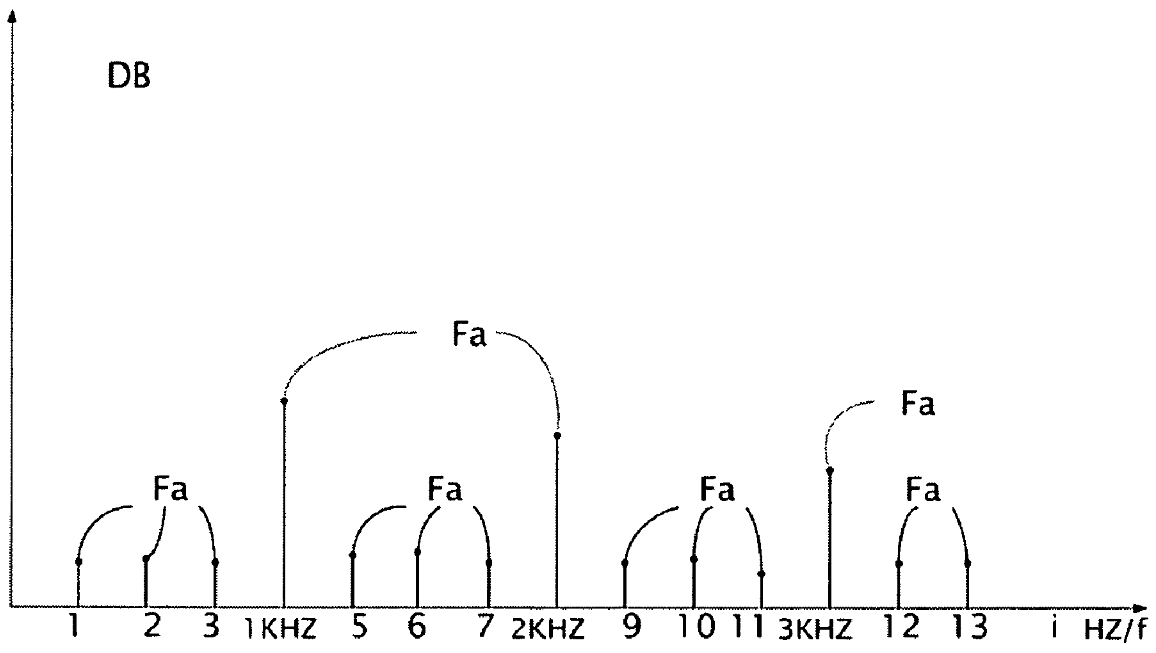
FIG. 2 is a spectrum diagram of frequency domain signals, produced by a first Fast Flourier Transform (FFT) in the audio device test system of FIG. 1.

FIG. 2 is showing a first Fourier spectrum of frequency domain signals obtained through the first FFT. The FFT module 103 obtains digital audio signals stored in the storage unit 40, and intercepts digital audio signals of a first predetermined length (hereinafter, first digital audio signals), and converts the first digital audio signals into the frequency domain signals through the first FFT, thus obtaining the first Fourier spectrum as shown in FIG. 2. In order to avoid spectrum leakage, the first digital audio signals are windowed based on a window function before performing the first FFT. The window function can be a Hamming window function, a Hanning window function, or other suitable window function.

In FIG. 2, a x-axis of the Fourier spectrum represents a frequency value, a y-axis of the first spectrum diagram represents an amplitude $F_a$ corresponding to the frequency value, and DB (decibel) is the unit for $F_a$. The frequency value in the x-axis $$f_i = \frac{f_s}{N*2} * i \quad (0 \le i \le N)$$

is determined by a first Fourier formula as follows:

In the first Fourier formula:

i is a whole number and represents a point in the x-axis;

$f_i$ is a frequency value corresponding to point i;

N represents the first predetermined length of the digital audio signals that the FFT module 103 intercepts; and $f_s$ is a sampled frequency.

The storing module 101 records the amplitudes ($F_a$) corresponding to the frequency values to the storage unit 40.

Figure 3:
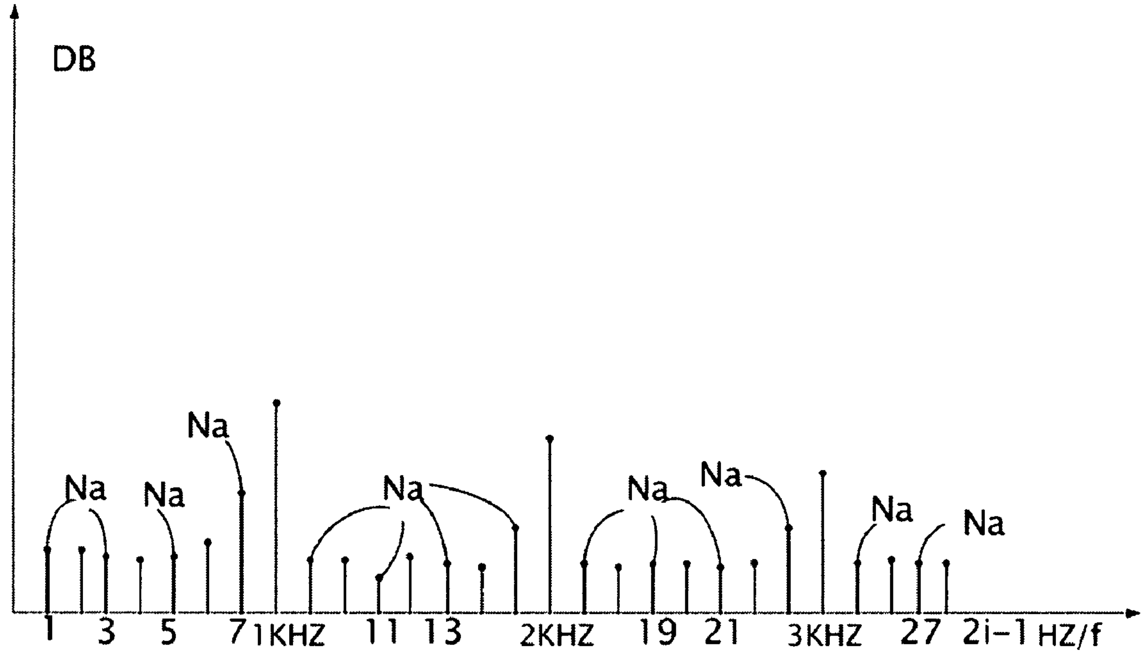
FIG. 3 is a spectrum diagram of frequency domain signals, produced by a second FFT in the audio device test system of FIG. 1.

FIG. 3 is showing a second Fourier spectrum of frequency domain signals produced by the second FFT. With the second FFT, the FFT module 103 invokes the digital audio signals stored in the storage unit 40, and intercepts digital audio signals of a second predetermined length (hereinafter, second digital audio signals). The second predetermined length is twice as long as the first predetermined length. After the second digital audio signal are windowed based on the window function, the FFT module 103 converts the windowed second digital audio signals into frequency domain signals through the second FFT, thus obtaining the second Fourier spectrum $$i = \frac{N'*2}{f_s} * f_i \quad (0 \le i \le N')$$

as shown in FIG. 3. Through the first Fourier formula, a second Fourier formula can be obtained as follows:

In the second Fourier formula:

i is also a whole number and represents a point in the x-axis;

$f_i$ is also a frequency value corresponding to point i;

N' represents the second predetermined length of the digital audio signals that the FFT module 103 intercepts; and $f_s$ is also a sampled frequency.

Because N' is twice than N in the first Fourier formula. So, a value of i in the second Fourier formula is twice the value of i in the first Fourier formula. In other words, the frequency value corresponding to point 2*i* in the second Fourier spectrum corresponds to point i in the first Fourier spectrum. For example, in the first Fourier spectrum, the frequency values $f_1, f_2, \ldots, f_i, f_N$ correspond to point 1, point 2, point i, point N respectively. In the second Fourier spectrum, the same frequency values $f_1, f_2, \ldots, f_i, f_N$ correspond to point 2, point 4, . . . , point 2*i*, point 2N (namely N') respectively. The frequency values corresponding to odd points i, e.g., point 1, point 3 . . . , point 2*i*−1, point 2N−1 of the second Fourier spectrum are regarded as noise composition, which are separated from the corresponding frequency values $f_1, f_2, \ldots, f_i, f_N$ of the first Fourier spectrum. The storing module 101 records the amplitudes $N_a$ of the noise composition (i.e., the amplitudes of odd points i of the second Fourier spectrum) in the storage unit 40.

The calculating module 104 subtracts $N_a$ from the corresponding $F_a$. For example, the calculating module 104 subtracts the amplitude of point 1 of the second Fourier spectrum from the amplitude of point 1 of the first Fourier spectrum, subtracts the amplitude of point 3 of the second Fourier spectrum from the amplitude of point 2 of the first Fourier spectrum, and so on, and subtracts the amplitude of point 2*i*−1 of the second Fourier spectrum from the amplitude of point i of the first Fourier spectrum.

After subtracting the noise composition, the FFT module 103 converts the frequency domain signals into time domain signals through inverse Fast Fourier Transform (iFFT). Because $N_a$, which is deemed as noise composition, has been eliminated from the frequency domain signals, the time domain signals are regarded as pure signals without noise interference. The FFT module 103 transmits the time domain signals to the testing module 105, the testing module 105 tests parameters of the time domain signals, for example, a parameter of "Signal to Noise", a parameter of "Total Harmonic Distortion", etc. Because the parameter test is a well-known technique, a detailed description of the parameter test has been omitted therein.

Figure 4:
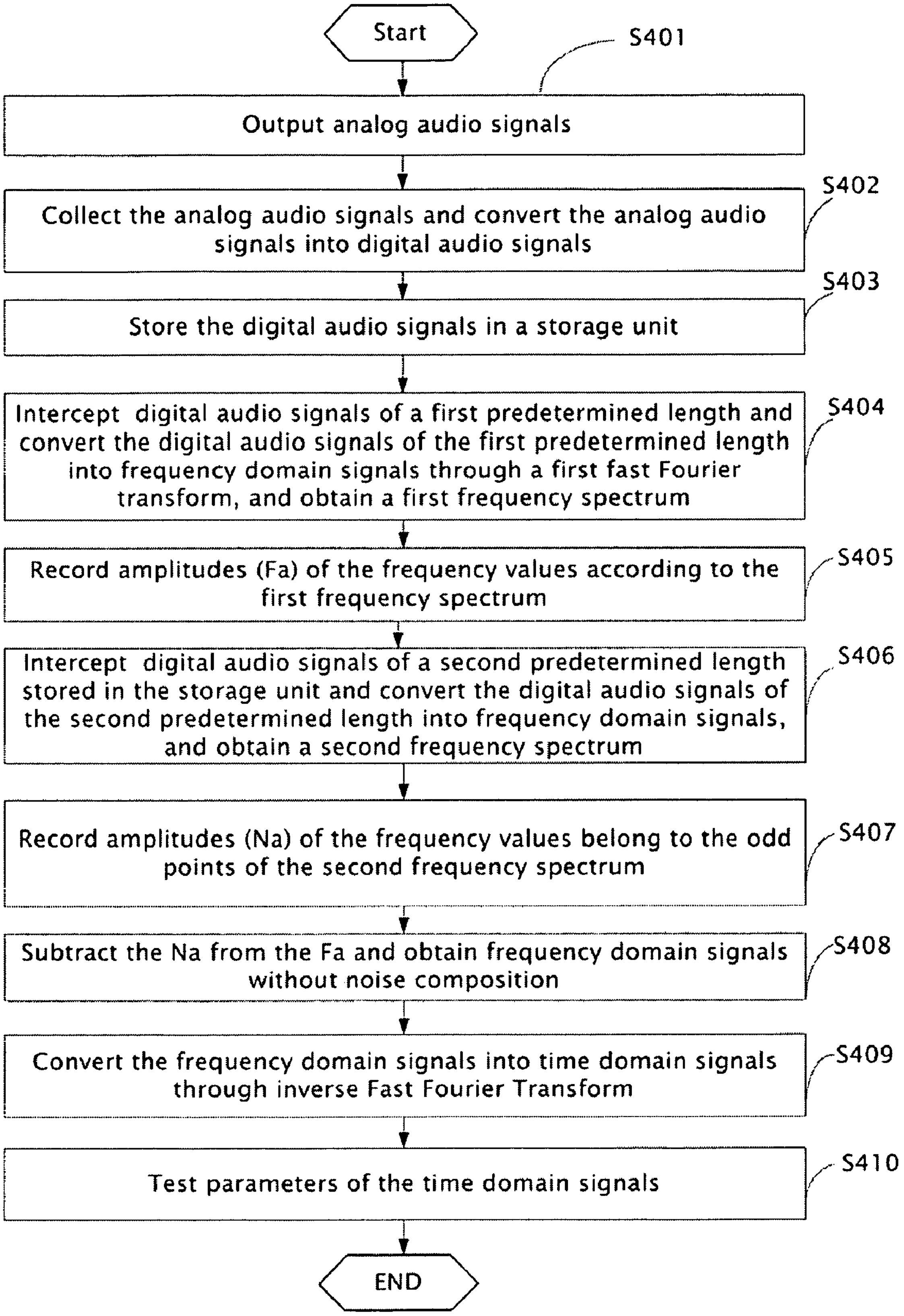
FIG. 4 is a flow chart illustrating an audio test method in accordance with an exemplary embodiment of the present invention.

FIG. 4 is a flowchart illustrating an audio device test method in accordance with an exemplary embodiment of the present invention. In step S401, the audio device outputs the analog audio signals.

In step S402, the audio collection device 20 collects the analog audio signals and the audio processing device 30 converts the analog audio signals into digital audio signals.

In step S403, the storing module 101 stores the digital audio signals in the storage unit 40.

In step S404, the FFT module 103 invokes the digital audio signals stored in the storage unit 40, and intercepts the digital audio signals of the first predetermined length (namely first digital audio signals), and converts the first digital audio signals into the frequency domain signals through the first FFT to obtain the first Fourier spectrum.

In step S405, the storing module 101 stores the amplitudes $F_a$ corresponding to the frequency values according to the first Fourier spectrum in the storage unit 40.

In step S406, the FFT module 103 invokes the digital audio signals stored in the storage unit 40, and intercepts the digital audio signals of the second predetermined length (namely second digital audio signals), and converts the second digital audio signals into the frequency domain signals through the second FFT to obtain the second Fourier spectrum.

In step S407, the storing module 101 stores the amplitudes $N_a$ corresponding to the frequency values according to the second Fourier spectrum in the storage unit 40.

In step S408, the calculating module 104 subtracts $N_a$ from the corresponding $F_a$ to obtain the frequency domain signals.

In step S409, the FFT module 103 converts the frequency domain signals into time domain signals through iFFT.

In step S410, the testing module 105 tests parameters of the time domain signals, for example, "Signal to Noise", "Total Harmonic Distortion", etc.

In addition, before the first FFT and the second FFT, the first digital audio signals and the second digital audio signals are windowed based on a window function to avoid spectrum leakage. The window function could be the Hamming window function or the Hanning window function.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An audio test apparatus capable of decreasing noise influence, the apparatus comprising:

a storage unit;

an audio collection device configured for collecting analog audio signals;

an audio processing device configured for converting the analog audio signals into digital audio signals or converting the digital audio signals into analog audio signals;

a storing module configured for storing the digital audio signals in the storage unit;

a Fast Fourier Transform (FFT) module configured for invoking the digital audio signals stored in the storage unit, intercepting digital audio signals of a first predetermined length, and converting the digital audio signals of the first predetermined length into frequency domain signals through a first FFT to obtain a first Fourier spectrum; and also configured for intercepting digital audio signals of a second predetermined length and converting the digital audio signals of the second predetermined length into frequency domain signals through a second FFT to obtain a second Fourier spectrum;

a calculating module configured for subtracting amplitudes corresponding to the frequency values belonging to odd points of the second Fourier spectrum from the corresponding amplitudes of the frequency values of the first Fourier spectrum, to obtain frequency domain signals without noise composition;

the FFT module being further configured for converting the frequency domain signals into time domain signals though an inverse Fast Fourier Transform (iFFT); and a testing module configured for testing parameters of the time domain signals;

wherein the storing module is further configured for storing the amplitudes corresponding to frequency values of the first Fourier spectrum, and the amplitudes corresponding to frequency values belonging to odd points of the second Fourier spectrum.

2. The audio test apparatus of claim 1, wherein the second predetermined length is twice as long as the first predetermined length.

3. The audio test apparatus of claim 1, wherein the audio collection device is a heart-shaped microphone.

4. The audio test apparatus of claim 1, further comprising a playback module configured for producing the analog audio signals, and the storage unit further storing a particular media file; wherein when an audio device to be tested by the audio test apparatus is only capable of output sound, the playback module plays the media file and the audio device outputs sound for the media file.

5. The audio test apparatus of claim 1, wherein the FFT module further windows the digital audio signals base on a window function before the first FFT and the second FFT.

6. The audio test apparatus of claim 5, wherein the window function is a Hamming window function or a Hanning window function.

7. An audio device test method for decreasing noise influence, comprising:

collecting analog audio signals outputted by an audio device;

converting the analog audio signals into digital audio signals;

storing the digital audio signals;

intercepting digital audio signals of a first predetermined length, and converting the digital signals of the first predetermined length into frequency domain signals through a first (Fast Fourier Transform) FFT to obtain a first Fourier spectrum;

recording amplitudes of the frequency values according to the first Fourier spectrum;

intercepting digital audio signals of a second predetermined length, and converting the digital signals of the second predetermined length into frequency domain signals through a second FFT to obtain a second Fourier spectrum;

recording amplitudes corresponding to the frequency values belonging to the odd points of the second Fourier spectrum;

subtracting the amplitudes corresponding to the frequency values belonging to the odd points of the second Fourier spectrum from the amplitudes corresponding to the frequency values of the first Fourier spectrum to obtain frequency domain signals without noise composition;

converting the frequency domain signals into time domain signals through an inverse Fast Fourier Transform (iFFT); and testing parameters of the time domain signals.

8. The audio device test method of claim 7, further comprising:

windowing the digital audio signals based on a window function before the first FFT and the second FFT.

9. The audio device test method of claim 8, wherein the window function is Hamming window function or Hanning window function.

10. The audio device test method of claim 7, wherein the second predetermined length is twice as long as the first predetermined length.

* * * * *